ns Patent [19]

Walsh et al.

[11] 4,029,854
[45] June 14, 1977

[54] HALOGEN ELECTRODE
[75] Inventors: Myles A. Walsh, West Falmouth; Fraser M. Walsh, Arlington; Dennis N. Crouse, Melrose, all of Mass.
[73] Assignee: Eco-Control, Inc., Cambridge, Mass.
[22] Filed: Jan. 27, 1976
[21] Appl. No.: 652,780

Related U.S. Application Data
[63] Continuation-in-part of Ser. No. 644,636, Dec. 29, 1975, abandoned.
[52] U.S. Cl. .................................. 429/27; 429/42; 429/213
[51] Int. Cl.² ........................................ H01M 4/00
[58] Field of Search ............ 136/121, 137; 204/72, 204/73 R, 282; 429/27, 40, 42, 44, 213, 217

[56] References Cited
UNITED STATES PATENTS

| | | | |
|---|---|---|---|
| 3,032,600 | 5/1962 | Mayer | 136/137 |
| 3,057,760 | 10/1962 | Dereska | 136/137 |
| 3,352,720 | 11/1967 | Wilson et al. | 136/137 |
| 3,625,764 | 12/1971 | DeRossi | 136/121 |
| 3,697,398 | 10/1972 | Wessling et al. | 204/72 |

Primary Examiner—John H. Mack
Assistant Examiner—H. A. Feeley
Attorney, Agent, or Firm—Kenway & Jenney

[57] ABSTRACT

An electrode for use in electrochemical cells in which a halogen is an active electrochemical agent. The electrode comprises a high surface area conductive matrix, preferably of carbon, with a polymer grafted thereto. The polymer has halogen active quaternary ammonium, sulfonium, or phosphonium sites or mixtures thereof incorporated into its structure which holds the halogen at the electrode until discharge.

A cell and battery which utilize the electrode and an aqueous electrolyte containing beneficial additives are also disclosed.

35 Claims, 2 Drawing Figures

HALOGEN ELECTRODE

CROSS REFERENCE TO RELATED APPLICATION

This application is a continuation-in-part of copending patent application Ser. No. 644,636 entitled "Halogen Electrode" filed on Dec. 29, 1975, now abandoned the teachings of which are incorporated herein by reference.

BACKGROUND OF THE INVENTION

This invention relates to electrodes, and more particularly, to electrodes useful in voltaic cells and batteries utilizing halogens such as bromine, chlorine, and iodine and metals such as zinc and cadmium as their electrochemically active agents.

Voltaic cells which include an aqueous solution of zinc halide or cadmium halide as the electrolyte are known. These devices are characterized by relatively high self-discharge rates, low capacities, and high internal resistances. Since liquid halogen is soluble in the aqueous electrolyte, it is difficult to keep metallic zinc or cadmium and liquid halogen apart while simultaneously achieving a system in which a good percentage of the theoretical energy storage capacity can be realized.

Various attempts have been made to prevent elemental halogen from migrating to the zinc or cadmium electrode. For example, U.S. Pat. No. 3,352,720 to G. R. Wilson et al. teaches the use of electrolyte insoluble polymeric amine halogen complexes in place of the elemental halogen. This cell suffers from a low capacity and a high self-discharge rate because of the low stability of the polyhalogens employed and because the solid complexes are distant from the inert current collector and therefore are not readily available for electrochemical reaction.

U.S. Pat. No. 3,816,177 to Myles A. Walsh teaches the use of soluble quaternary ammonium halides dissolved in the electrolyte in combination with a water soluble complexing solvent which combines with the quaternary polyhalides formed during liberation of liquid halogen to form insoluble, halogen rich, oil-like complexes. If an inert electrode made of a material which absorbs the complex is employed, an improved cell is provided, since the complex is relatively stable and since the halogen molecules, being concentrated about the current collector, are available for electrochemical reaction to an improved degree. The present invention, however, represents a further improvement in such halogen cells and batteries.

SUMMARY OF THE INVENTION

Embodiments of this invention overcome or greatly reduce many of the problems inherent in prior art halogen cells by providing a new electrode comprising an extremely stable polymer, with quaternary ammonium, phosphonium, or sulfonium sites incorporated into its structure, which is bonded to the current collecting matrix. Preferably the matrix is formed of carbon. Such carbon-polymer electrodes are capable of storing halogens, particularly bromine, in a non-chemically active but highly electrochemically active state in such a manner that uniform, intimate electrical contact is maintained between the bromine rich quaternary ammonium, phosphonium, or sulfonium sites and the current collector, and interaction between halide in the electrolyte and the quaternary sites is greatly facilitated. Consequently, an electrode is provided which enables the construction of a primary or secondary zinc or cadmium halide cell or battery in which the problem of halogen migration is greatly reduced; the amount of halogen that remains available in the cell as poly-halogen is increased when compared with prior art cells; internal resistance, as measured by voltage loss at constant load, is significantly decreased; self-discharge is reduced (hence shelf life enhanced); rate of discharge is increased; and capacity is increased.

In general, the invention features an electrode for interacting with electrochemically active halogens in an electrochemical cell comprising a matrix serving as a current collector and a polymer, containing quaternary ammonium, phosphonium, or sulfonium sites, bonded to the matrix. The electrode is produced by forming a high surface area matrix, preferably of carbon, having structural integrity, and then reacting a monomer, (containing the reactive sites) with the carbon to form a polymer bonded to the matrix. A cell is provided comprising a casing, a zinc or cadmium metal electrode, a counter electrode spaced from the metal electrode, an aqueous electrolyte, and a quaternary ammonium, phosphonium, or sulfonium salt bonded to a polymer, which, in turn, is bonded to the counter electrode. A bipolar, multi-cell battery is also provided wherein a plurality of bipolar electrodes made of conductive polymer film are interposed between a zinc or cadmium electrode and the carbon-polymer current collecting electrode of the invention.

In preferred embodiments, the polymer is the reaction product of an alkeneoxy methacryl tri-substituted ammonium halide with carbon in the presence of at least one other monomer. Preferably, the polymer is the product of the reaction of 2-ethyleneoxy methacryl - N,N,N-trimethyl ammonium bromide with carbon in the presence of ethylene dimethacrylate and a free radical initiator such as 2,2-azobis-(2-methylpropionitrile).

The matrix is preferably formed from a carbon chosen from the group consisting of graphite felt, graphitic carbon black, carbon black, activated charcoal, and acetylene black.

The aqueous electrolyte includes one or more members of the group consisting of zinc bromide, zinc chloride, zinc iodide, cadmium bromide, cadmium chloride, and cadmium iodide. The electrolyte may further include an additive comprising one or more members of the group consisting of zinc sulfate, cadmium sulfate, lead bromide, lead chloride, lead iodide, acetate buffer, tribromoacetic acid, quaternary ammonium, phosphonium or sulfonium halides, ethylene oxide condensates, dextrin, and a glycol.

Other advantages and features of the invention will be apparent from the description which follows.

DESCRIPTION OF THE PREFERRED EMBODIMENTS

Figure 1:
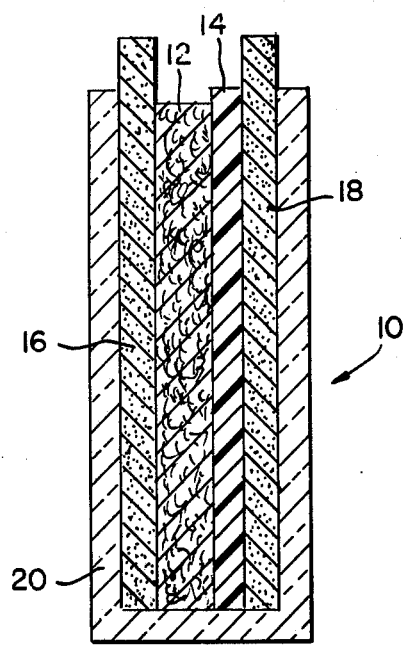
FIG. 1 is a cross-sectional view of a cell incorporating the electrode of the invention.

At the outset, it is desirable to comment on certain terms that are used throughout this specification and claims. For example, the terms "zinc electrode" and "bromine electrode" are not intended to necessarily imply that the electrode elements are formed of these materials exclusively. As is conventional practice, the terms are used merely to indicate the electrochemically active element reacting.

The zinc or cadmium electrodes are preferably porous, electrically conductive, and non-corrosive. Carbon in its various forms, either porous or non-porous, is a preferred material since it serves as a plating surface for zinc or cadmium. Since cadmium is chemically similar to zinc, it is obvious that the zinc in the electrode and the electrolyte of any example which follows can be replaced by cadmium.

The word "bonded", as used with reference to the relationship of the matrix and a polymer in this application, means a monomer is polymerized in the presence of a matrix so that the resulting polymer cannot physically be separated from that matrix.

Of the three halogens which are operable in the present invention, bromine is preferred, and although most of the examples and disclosures herein discuss bromine, it will be understood that chlorine and iodine may be substituted for bromine. The term "halogen", when used herein with reference to the electrolyte, refers to bromine, chlorine, and iodine only.

During discharge of the well known zinc-bromine cell, the following half-reactions occur:

at cathode $Br_2 + 2e^- \rightarrow 2\ Br^-$ at anode $Zn^\circ \rightarrow Zn^{++} + 2e^-$ On charging, the reactions are reversed:

at cathode $2\ Br^- \rightarrow Br_2 + 2e^-$ at anode $Zn^{++} + 2e^- \rightarrow Zn^\circ$ The zinc bromide of the electrolyte is hence consumed on recharging and produced on discharge. In order for the cell to function properly, $Br_2$, which obviously must be present near the cathode when the cell is undergoing discharge, must somehow be stored. Since $Br_2$ is soluble in water, precautions must be taken to prevent it from migrating through the electrolyte and reacting directly with the metallic zinc at the anode. This invention furnishes an inert electrode with a large surface area which can uniformly and tightly hold $Br_2$ on charging of the cell and easily release $Br^-$ ions during discharge, thereby eliminating the $Br_2$ migration problem, keeping bromine in close proximity to the current collector, and greatly enhancing the efficiency of the cell.

This goal has been reached by forming a porous, conducting matrix having sufficient structural integrity to permit handling and mounting, and a high surface area, and bonding a polymer containing bromine reactive sites, e.g. quaternary ammonium halide sites, to its surface.

The presently preferred matrix material is carbon. Several types of carbon have been used to form the porous matrix including graphite felt, graphite carbon black, activated charcoal, carbon black, and acetylene black.

The matrix may be fabricated as a pressed carbon electrode using well known temperature and pressure procedures, with suitable binders.

A second type of carbon matrix, utilizing graphite felt as a backbone, may be fabricated using the following procedure.

A circular piece of graphite felt (Union Carbide Co., WDF grade), 18.5 cm in diameter, is cut to fit a porcelain Buchner filter funnel. The funnel with the felt is placed in a vacuum filter flask and suction from a water aspirator is applied. A well-mixed suspension of one of the various carbon powders in methanol, for example 21 g of dry-blended carbon black (Vulcan XC-72, Cabot Co.), is poured through the felt and the liquid is recovered from the flask. The loose carbon from the felt is then scraped off and resuspended in the methanol (diluting to 300 ml if necessary) and poured through again. Loose carbon is again removed and resuspended, but the felt is turned over in the funnel before again pouring the resuspension through. This scraping, suspending, turning, and pouring procedure is repeated four times, with water or methanol.

A third type of matrix is constructed by tamping the carbon black into a bag of CELANESE 2400 W (microporous polypropylene membrane polymer made by Celanese Plastic Co.) which is heat sealed around a graphite plate current collector. Those skilled in the art will have little difficulty substituting other types of matrices, for example, those made of nickel phosphide, silicon carbide, and vitreous carbon.

The next step in the fabrication of the electrode is to bond a polymer containing quaternary ammonium, phosphonium or sulfonium sites to the matrix. To be effective, the polymer must have the following characteristics:

1. it must remain a liquid or gel throughout charge and discharge to allow rapid migration of bromine to and from electrically conductive sites in the medium, hence, it must have displacable room for bromine and must provide only minimal steric screening thereof;

2. it must contain reactive groups which complex tightly with $Br_2$ to prevent dissociation to the zinc electrode and to prevent bromination of cell components, yet the polymer itself must be non-reactive with bromine to ensure its long term stability;

3. its halogen reactive groups should be as close together as possible and the corresponding monomer's molecular weight as low as possible (100–350 amu) so that the amount of halogen held in a given volume is as large as possible; and 4. it must remain in intimate contact with conductive sites on the electrode. In this regard, it is imperative that the polymer be capable of being polymerized in the presence of the matrix.

To meet these requirements, the polymer must contain quaternary ammonium, sulfonium, or phosphonium cationic functionalities and a counter ion, preferably $I^-$, $Cl^-$, $Br^-$, or $F^-$.

Any cross linker which polymerizes with polymers having these properties, especially if the cross linker lowers the water solubility of the resulting polymer, is useful. Obviously, those skilled in the polymer art will have little difficulty in selecting one of the large numbers of polymers which, to varying degrees, will satisfy these requirements.

The presently preferred polymer meeting the above recited requirements was made by reacting 2-ethyleneoxy methacryl-N,N,N-trimethyl ammonium bromide with a carbon matrix in the presence of ethylene dimethacrylate and the free radical initiator, 2'2'-azobis-(2-methylpropionitrile).

The following procedure exemplifies the presently preferred method for making such polymer electrodes. Dissolve 68.1 g of 2-ethyleneoxy methacryl-N,N,N trimethyl ammonium bromide (produced by well-known techniques from commercially available reagent grade 2 dimethylamino-ethylenoxy methacrylate) in hot methanol (60° C) to make a total volume of about 200 ml. Add 1.34 g of ethylene dimethacrylate and 6.8 ml of nitromethane to the solution, and dilute to 270 ml with methanol. Add 0.443 g of 2,2'-azobis (2-propionitrile), and stir to dissolve.

Roll four, 2 × 6 inch pieces of graphite felt (Union Carbide Co., WDF grade) (with or without carbon impregnation) to fit into a wide mouth jar (4 ¾ inches deep × 2 ⅛ inches I.D.) equipped with a screw cap. Pour the above solution into the jar to cover the felts. Cover the jar with aluminum foil and PARAFILM (a paraffin made by American Can Co., Marathon Products, Neenah, Wisc.). Screw the cap onto the jar. Heat the cap with a hot air blower to melt the paraffin, then tighten to seal. Submerge the jar totally in a 60°–65° C water bath and allow to polymerize overnight.

Remove the felts, separating them from the sides of the jar with a thin flat spatula. Unroll the felts and soak them four times in fresh methanol or water in a large beaker. For different numbers of felts or different jar sizes, determine the volume of liquid necessary to cover the felts and adjust amounts of all ingredients proportionally.

Polymers having quaternary ammonium, sulfonium, and phosphonium salt functionalities bonded on carbon as utilized in the present invention, react with halides to form polyhalides as follows:

by reacting 2-ethyleneoxy methacryl-N,N,N-trimethyl ammonium bromide with the polymer felt electrode disclosed above, using graphite felt as a backbone, and a porous, polypropylene, ribed separator 14 (DARAMIC, W. R. Grace & Co.), sandwiched between a pair of graphite plate current collectors 16, 18. Plate 18 serves as the metal electrode. The cells constructed as shown in FIG. 1 were enclosed in a watertight glass casing 20, and saturated with aqueous electrolyte, containing $Zn^{++}$ and $Br^-$ ions. The presently preferred electrolyte, including additives, is a solution of zinc bromide (1 to 6M), lead ions (0.001 to 0.1M), aprotic dipole (0.1 to 5%), and polyoxy ethers (0.01 to 0.1%).

Table 1 shows the effect of the bonding of the polymer to the carbon matrices listed. All cells were constructed in accordance with FIG. 1 using the materials listed below in place of carbon polymer electrode 12 and were charged and discharged at a 1 amp rate. Capacity efficiency is defined here as ampere-hours out per theoretical ampere-hours capacity, determined by the amount of $ZnBr_2$ present.

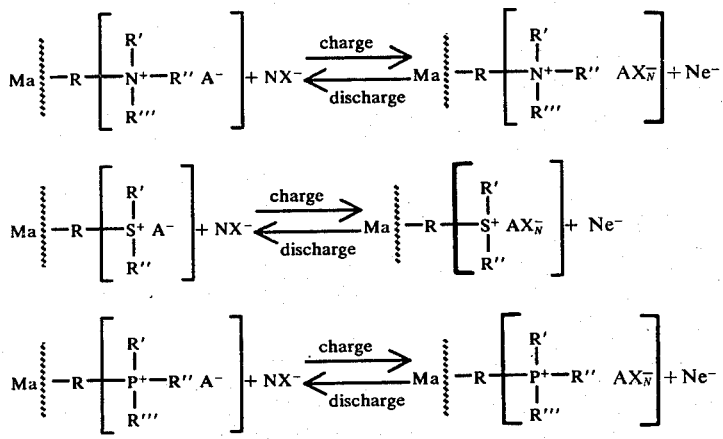

Where Ma is the matrix, R is the polymer, A is a counter ion preferably chosen from the group of Cl, Br, I, and F, X is Br, Cl, or I, and N is an integer equal to 2, 4, 6, 8, 10, or 12. The substitution of the nitrogen, sulfur and phosphorous atoms (R', R'', R''') may be hydrogen, alkyl, aryl, organic acids, alcohols, amines, carbonate, esters, ethers, ketones, sulfides, sulfoxides, sulfones, sulfates, phosphates, ammonium groups, amides, thioesters, carbonates, acetals, ketals, nitriles, or any combination thereof. The nitrogen, phosphorous, or sulfur of the cationic functionalities may be part of one or more cyclic structures. On charging, the reaction proceeds to the right, on discharge, to the left.

Referring to FIG. 1, a cell 10 is shown comprising a carbon polymer electrode 12 (counter electrode) made Table 1

| Felt Based Electrodes | | | |
|---|---|---|---|
| Electrode Used | Voltage* loss volts | Capacity amp-hrs. | Capacity Efficiency % |
| 1. Felt, no polymer | 0.93 | .4 | 20 |
| 2. Felt & Polymer** | 2.73 | <.1 | <5 |
| 3. Polymer(Felt)+ | 1.78 | .8 | 53 |
| 4. Polymer(Felt + 3.8g VULCAN XC-72 Carbon Black-Cabot Co.)+ | 1.06 | 1.1 | 73 |
| 5. Polymer(Felt + 0.9g acetylene black)+ | 0.90 | 0.7 | 47 |
| 6. Polymer(Felt + 1.9g VULCITE-carbon black)+ | 1.16 | 1.1 | 73 |
| 7. Polymer(Felt + 5.1g NORIT activated carbon, American Norit Co.)+ | 1.20 | 1.0 | 66 |

*at 2 amp load per 10 in.² of electrode surface area
**polymer not polymerized in presence of the felt but merely mixed with the felt after polymerization
+monomer polymerized in presence of felt and/or carbon as indicated This table shows that the effect of bonding the polymer to the carbon matrix is twofold: an increase in capacity and a decrease in internal resistance (as measured by voltage loss).

Table 2 shows the effect of bonding the polymer to carbon in the felt on the shelf life of the cell of FIG. 1.

Table 2

Effect of Polymer on Capacity Remaining

| Hours on Shelf | Polymer-Felt | Felt(without polymer) |
|---|---|---|
| 0 | 92% | 20% |
| 12 | 85% | 5% |
| 24 | 81% | 1% |
| 64 | 71% | 1% |
| 168 | 52% | 1% |

(Cells generally charged to only 70% of theoretical capacity due to overvoltage increasing hydrogen gasing)

This table indicates that cells constructed in accordance with the invention exhibit significantly decreased self-discharge rates when compared with carbon impregnated graphite felt electrodes.

Table 3 shows the effect of adding small amounts of soluble quaternary ammonium species to the electrolyte of the cell of FIG. 1.

Table 3

Effect of Adding Quaternary Ammonium Species to Polymer-Felt Cells

| Additive | Voltage loss volts (at 2amp load) | Capacity amp-hrs. | Capacity Efficiency % |
|---|---|---|---|
| none | 1.78 | 0.8 | 53 |
| 1.2 M NH$_4$Br | 0.93 | 1.2 | 80 |
| 0.05 M C$_6$H$_{14}$ONBr* | 0.99 | 1.0 | 67 |
| 1.2 M NH$_4$Cl | 1.35 | 0.9 | 60 |

*N,N-Dimethyl morpholinium bromide

Note that there is a further decrease in internal resistance (as measured by voltage loss) and a slight increase in capacity when the quaternary species is added as compared to the internal resistance and capacity of cells not containing the additive. Other quaternary ammonium containing polymers with more nitrogen sites or with lower molecular weight should provide further increases in capacity. Sulfonium and phosphonium quaternary species exhibit similar properties.

A second set of cells were constructed as indicated above, but with polymer-carbon electrodes made by tamping polymer-carbon black into a Celgard 2400W bag (a microporous polypropylene bag made by Celanese Plastic Co.) heat sealed around a graphite plate current collector. These were then substituted for the polymer felt electrode and tested to demonstrate that the benefit of bonding the carbon surface to the polymer is a general phenomenon. This is not as well compacted an electrode as can be fabricated by temperature and pressure procedures normally employed for making pressed carbon electrodes. The lack of capacity observed is probably a function of lack of contact between carbon particles. The glass-enclosed, single cell used in the tests were made from 2 graphite plate current collectors (approx. 250 mil, one enclosed in a bag of 2400W), 10 g polymer carbon black (in bag with graphite plate), and 1 porous separator (Daramic, approx. 125 mil, a porous polypropylene ribed material, W. R. Grace & Co.). These cells were constructed in accordance with FIG. 1 except that the current collector 16 and electrode 20 were replaced by the polypropylene bag containing the carbon polymer and current collector. The electrolyte contained 1.5 M ZnBr$_2$, 0.25 M NH$_4$Br or ZnSO$_4$ and $10^{-3}$ M PbBr$_2$. The cells were charged and discharged at 1 amp. Table 4 shows the effect of decreasing the ratio (by weight) of polymer to carbon black.

Table 4

Polymer/Carbon Black using 10 g carbon black VULCITE in 2400W bag

| Ratio | Voltage loss volts | Capacity amp-hrs. | Theoretical Capacity* amp-hrs. |
|---|---|---|---|
| 6:1 | 1.40 | 0.5 | 1.8 |
| 3:1 | 1.24 | 0.8 | 1.6 |
| 1.5:1 | 0.74 | 1.0 | 1.3 |

*Theoretical capacity based on formation of a tribromide with quaternary ammonium sites present; cells actually charged to 2.1 amp-hrs.

These data show that an electrode material can be made of a carbon black to which has been bonded a quaternary ammonium containing polymer which has low internal resistance and relatively large capacity for bromine storage.

Table 5 shows that bonding the polymer to the carbon surfaces decreases internal resistance. The cells, constructed with the CELANESE bag type electrode, contained 7.5 g of polymer and 2.5 g carbon. Those using C$_6$H$_{14}$ONBr (0.2M) had 6% sulfolane added, which tended to decrease electrolyte conductivity.

Table 5

Carbon Powder Electrodes

| Matrix | Voltage loss volts+ |
|---|---|
| VULCITE (carbon black) | 0.43 |
| VULCAN XC-72 + C$_6$H$_{14}$ONBr | 0.98 |
| VULCAN + Polymer* | 1.78 |
| Polymer (VULCAN)** | 1.34 |
| VULCITE + C$_6$H$_{14}$ONBr | 0.79 |
| VULCITE + Polymer* | 1.49 |
| Polymer (VULCITE)** | 1.34 |
| Acetylene Black + C$_6$H$_{14}$ONBr* | 0.71 |
| Polymer (Acetylene Black)** | 0.80 |

+at 2.0 ampere load per 10 in.$^2$ electrode surface area
*polymer was physically mixed with the carbon after polymerization
**monomer was polymerized in the presence of the carbon indicated in parentheses.

Approximately 90% of the stored capacity of the electrode is discharged at voltages over 1 volt. As indicated above, self-discharge is greatly diminished in the cells of the present invention when compared with prior art devices. Discharge rates, for the same voltage loss, are a factor of 10 greater for the electrodes of the invention over the oil felt cells disclosed in U.S. Pat. No. 3,816,177.

Table 6 shows the increased ZnBr$_2$ concentrations in the electrolyte have a tendency to decrease internal resistance (again, as measured by decrease in voltage loss) and to increase capacity. Observations of the cells showed increased bromine concentration after approximately 2.6 ampere hours of charge for a felt electrode containing approximately 12 grams of polymer.

Table 6

Effect of Increase ZnBr$_2$ Concentrations on Polymerized Felt Impregnated with VULCAN XC-72

| [ZnBr$_2$], M | Voltage loss volts | Capacity amp-hrs. | Capacity Efficiency % |
|---|---|---|---|
| 0.8 | 0.65 | 1.1 | 78 |
| 1.6 | 0.47 | 1.25 | 83 |
| 3.0 | 0.42 | 3.9 | 72 |
| 3.2 | 0.42 | 2.9 | 73 |

The addition of $ZnSO_4$ and/or $PbBr_2$, as well as materials such as poly-ethyleneoxy surfactants, dextrin, or a glycol was observed to enhance zinc plating characteristics as well as decrease $H_2$ formation rates. The addition of $NH_4Br$ or $C_6H_{14}ONBr$ was found to enhance electrolyte conductively as well as to increase cell capacity. The addition of $C_6H_{14}ONBr$ to form a quaternary ammonium polyhalide requires the addition of an aprotic dipole (e.g. sulfolane) which decreases electrolyte conductivity. Acetate buffering has been observed to significantly increase cell capacity and efficiency. Decreases in cell capacity during cycling, when an acetate buffer is used, indicates that some bromination of the acetate occurs. However, use of tribromoacetic acid gives equally beneficial results while greatly reducing the possibility of bromination.

Figure 2:
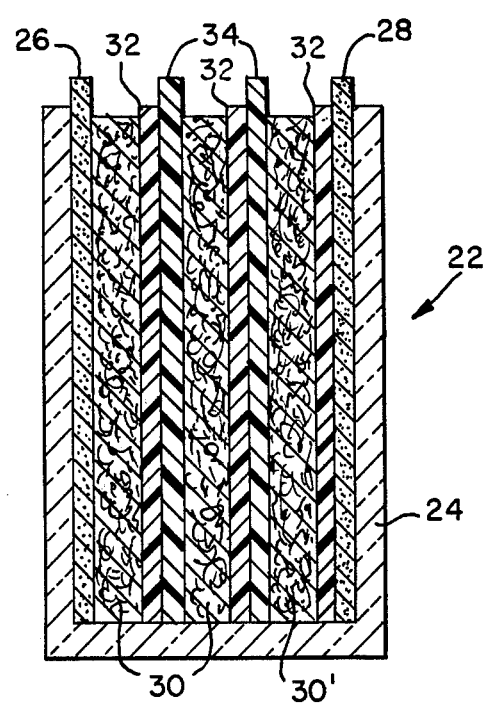
FIG. 2 is a cross-sectional view of a battery incorporating the electrode of the invention.

FIG. 2 depicts a bipolar, multi-celled battery 22 made in accordance with the invention. It comprises a glass, watertight case 24, which encloses a pair of graphite plate current collectors 26, 28. Plate 28 serves as the metal electrode. Interposed between the current collectors 26, 28 is an array of graphite felt-polymer counter electrodes 30, constructed in accordance with the invention. A porous polymeric separator 32 (DARAMIC approximately 0.125 inch thick) and a bipolar electrode 34 (conductive polymer film made by Conductive Polymer Corporation, Marblehead, Mass., approximately 0.020 inch thick) are in turn interposed between each electrode 30. As is understood in the art, only a separator need be placed between the last electrode 30 and the current collector 28. The number of cells in the battery, of course, may be increased or decreased as desired.

In operation, the battery of FIG. 2 (or the cell of FIG. 1) is saturated with an aqueous electrolyte containing, preferably, a high concentration of $Zn^{++}$ or $Br^-$ ions, and a source of direct current (not shown) is attached to the current collectors 26, 28 (or, in the case of the cell, 16, 18). As charging proceeds, $Zn^{++}$ in the electrolyte is reduced and plates onto metal electrode current collector 28 (18 in FIG. 1), and $Br^-$ is oxidized to $Br_2$ and complexes, as described above, at the reactive sites in the polymer in electrodes 30 (12 in FIG. 1).

On discharge, $Zn^0$ is oxidized and gives up electrons to current collector 28 (18 in FIG. 1), and the complexed $Br_2$ is reduced to $Br^-$ ion, in the process taking electrons from current collector 26 (16 in FIG. 1).

Thus it can be seen that a zinc or cadmium halide cell and battery are provided in which the problem of halogen migration is greatly reduced. The capacity and rate of discharge of the novel cell is increased when compared with prior art halogen cells and, at the same time, its internal resistance and self-discharge rate is reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An electrode for interacting with electrochemically active halogens in an electrochemical cell, said electrode comprising a conductive matrix and a polymer, said polymer having functional groups selected from the group consisting of quaternary ammonium salts, sulfonium salts, phosphonium salts, and mixtures thereof, said polymer being polymerized in the presence of said conductive matrix to become bonded thereto, said polymer remaining a separate phase from the electrolyte throughout charge and discharge, said polymer having displaceable room for the electrochemically active halogen, said polymer reversibly complexing with the electro-chemically active halogen, said polymer not reacting irreversibly with the electrochemically active halogen, and said polymer being formed from a monomer with a molecular weight in the range of 100–350 amu.

2. The electrode of claim 1 wherein said salts have counter ions selected from the group consisting of chloride, bromide, iodide, fluoride, and mixtures thereof.

3. The electrode of claim 1 wherein said functionalities comprise quaternary ammonium halides.

4. The electrode of claim 1 wherein said functionalities comprise phosphonium halides.

5. The electrode of claim 1 wherein said functionalities comprise sulfonium halides.

6. The electrode of claim 1 wherein said polymer containing said functionalities comprises a polymethacrylate.

7. The electrode of claim 6 wherein said polymer containing said functionalities is the product of reaction of 2 ethyleneoxymethacryl-N,N,N-trimethyl ammonium bromide in the presence of ethylene-dimethacrylate and a free radical initiator.

8. The electrode of claim 7 wherein said free radical initiator is 2,2'-azobis (2-methylpropionitrile).

9. The electrode of claim 1 wherein said conductive matrix is formed from a carbon selected from the group consisting of graphite felt, graphitic carbon black, carbon black, activated charcoal, acetylene black, and mixtures thereof.

10. A cell of the type including a casing, an Me electrode, where Me is a metal selected from the group consisting of cadmium and zinc, a counter electrode spaced apart from said Me electrode, and an aqueous electrolyte, wherein said counter electrode comprises a conducting matrix and a polymer, said polymer having functional groups selected from the group consisting of quaternary ammonium, sulfonium and phosphonium salts, and mixtures thereof, said polymer being polymerized in the presence of said conductive matrix to become bonded thereto, said polymer remaining a separate phase from the electrolyte throughout charge and discharge, said polymer having displaceable room for the electro-chemically active halogen, said polymer reversibly complexing with the electro-chemically active halogen, said polymer not reacting irreversibly with the electro-chemically active halogen, and said polymer being formed from a monomer with a molecular weight in the range of 100–350 amu.

11. The cell of claim 10 wherein said cell is a secondary cell.

12. The cell of claim 10 wherein said salts have counter ions selected from the group consisting of chloride, bromide, iodide, fluoride, and mixtures thereof.

13. The cell of claim 10 wherein said functionalities comprise quaternary ammonium halides.

14. The cell of claim 10 wherein said functionalities comprise phosphonium halides.

15. The cell of claim 10 wherein said functionalities comprise sulfonium halides.

16. The cell of claim 10 wherein said polymer containing said functionalities comprises a polymethacrylate.

17. The cell of claim 16 wherein said polymer containing said functionalities is the product of reaction of 2 ethyleneoxymethacryl-N,N,N-trimethyl ammonium bromide in the presence of ethylene-dimethacrylate and a free radical initiator.

18. The cell of claim 17 wherein said free radical initiator is 2,2'-azobis (2-methylpropionitrile).

19. The cell of claim 10 wherein said conducting matrix comprises carbon.

20. The cell of claim 10 wherein said conductive matrix is formed from a carbon selected from the group consisting of graphite felt, graphitic carbon black, carbon black, activated charcoal, acetylene black, and mixtures thereof.

21. The cell of claim 10 wherein said electrolyte contains cations selected from the group consisting of $Cd^{++}$ and $Zn^{++}$ and anions selected from the group consisting of $Br^-$, $Cl^-$, and $I^-$.

22. The cell of claim 21 wherein said electrolyte includes an additive selected from the group consisting of zinc sulfate, an acetate buffer, tribromoacetic acid, cadmium sulfate, quaternary ammonium halides, sulfonium halides, phosphonium halides, lead halides, polyethyleneoxy surfactants, dextrin, a glycol, and mixtures thereof.

23. A battery of the type including a casing, an Me electrode, where Me is a metal selected from the group consisting of cadmium and zinc, a plurality of counter electrodes spaced apart from said Me electrode, a bipolar electrode interposed between each adjacent pair of said counter electrodes, and an aqueous electrolyte, wherein said counter electrodes comprise a conducting matrix and a polymer, said polymer having functional groups chosen from the group consisting of quaternary ammonium, sulfonium, and phosphonium salts, and mixtures thereof, said polymer being polymerized in the presence of said conductive matrix to become bonded thereto, said polymer remaining a separate phase from the electrolyte throughout charge and discharge, said polymer having displaceable room for the electro-chemically active halogen, said polymer reversibly complexing with the electro-chemically active halogen, said polymer not reacting irreversibly with the electro-chemically active halogen, and said polymer being formed from a monomer with a molecular weight in the range of 100–350 amu.

24. The battery of claim 23 wherein said cell is a secondary cell.

25. The battery of claim 23 wherein said salts have counter ions selected from the group consisting of chloride, bromide, iodide, fluoride, and mixtures thereof.

26. The battery of claim 23 wherein said functionalities comprise quaternary ammonium halides.

27. The battery of claim 23 wherein said functionalities comprise phosphonium halides.

28. The battery of claim 23 wherein said functionalities comprise sulfonium halides.

29. The battery of claim 23 wherein said polymer containing said functionalities comprises a polymethacrylate.

30. The battery of claim 29 wherein said polymer containing said functionalities is the product of reaction of 2 ethyleneoxymethacryl-N,N,N-trimethyl ammonium bromide in the presence of ethylene-dimethacrylate and a free radical initiator.

31. The battery of claim 30 wherein said free radical initiator is 2,2'-azobis (2-methylpropionitrile).

32. The battery of claim 23 wherein said conducting matrix comprises carbon.

33. The battery of claim 23 wherein said conductive matrix is formed from a carbon selected from the group consisting of graphite felt, graphite carbon black, carbon black, activated charcoal, acetylene black, and mixtures thereof.

34. The battery of claim 23 wherein said electrolyte contains cations selected from the group consisting of $Cd^{++}$ and $Zn^{++}$ and anions selected from the group consisting of $Br^-$, $Cl^-$, and $I^-$.

35. The battery of claim 34 wherein said electrolyte includes an additive selected from the group consisting of zinc sulfate, an acetate buffer, tribromoacetic acid, cadmium sulfate, quaternary ammonium halides, sulfonium halides, phosphonium halides, lead halides, polyethyleneoxy surfactants, dextrin, a glycol, and mixtures thereof.

* * * * *